United States Patent [19]

Honjo et al.

[11] 4,285,716
[45] Aug. 25, 1981

[54] METHOD OF QUENCHING GLASS SHEETS

[75] Inventors: Seiichiro Honjo, Muko; Masaaki Ijichi, Kyoto; Hiroaki Masunaga, Nagaokakyo; Keiji Hara, Joyo, all of Japan

[73] Assignee: Nippon Sheet Glass Co., Ltd., Osaka, Japan

[21] Appl. No.: 57,561

[22] Filed: Jul. 16, 1979

[30] Foreign Application Priority Data

Jul. 14, 1978 [JP] Japan ................................ 53-85177

[51] Int. Cl.³ .............................................. C03B 27/04
[52] U.S. Cl. ........................................ 65/114; 65/115; 65/348; 65/351
[58] Field of Search .................. 65/114, 115, 348, 351

[56] References Cited

U.S. PATENT DOCUMENTS

| 3,508,898 | 4/1970 | Akfirat ................................... 65/114 |
| 4,178,414 | 12/1979 | Greenhalgh ....................... 65/114 X |
| 4,182,619 | 1/1980 | Greenhalgh ........................... 65/114 |

Primary Examiner—Arthur D. Kellogg
Attorney, Agent, or Firm—Basile, Weintraub & Hanlon

[57] ABSTRACT

While a heated glass sheet moves through a quenching section, the glass sheet is blown with air in the same portions so as to be quenched always in the same portions to provide on the glass surface rapidly cooled portions and uncooled portions. Thereby the residual strains on the glass surface are made different to prevent the generation of pieces or splines when the glass sheet is broken.

5 Claims, 7 Drawing Figures

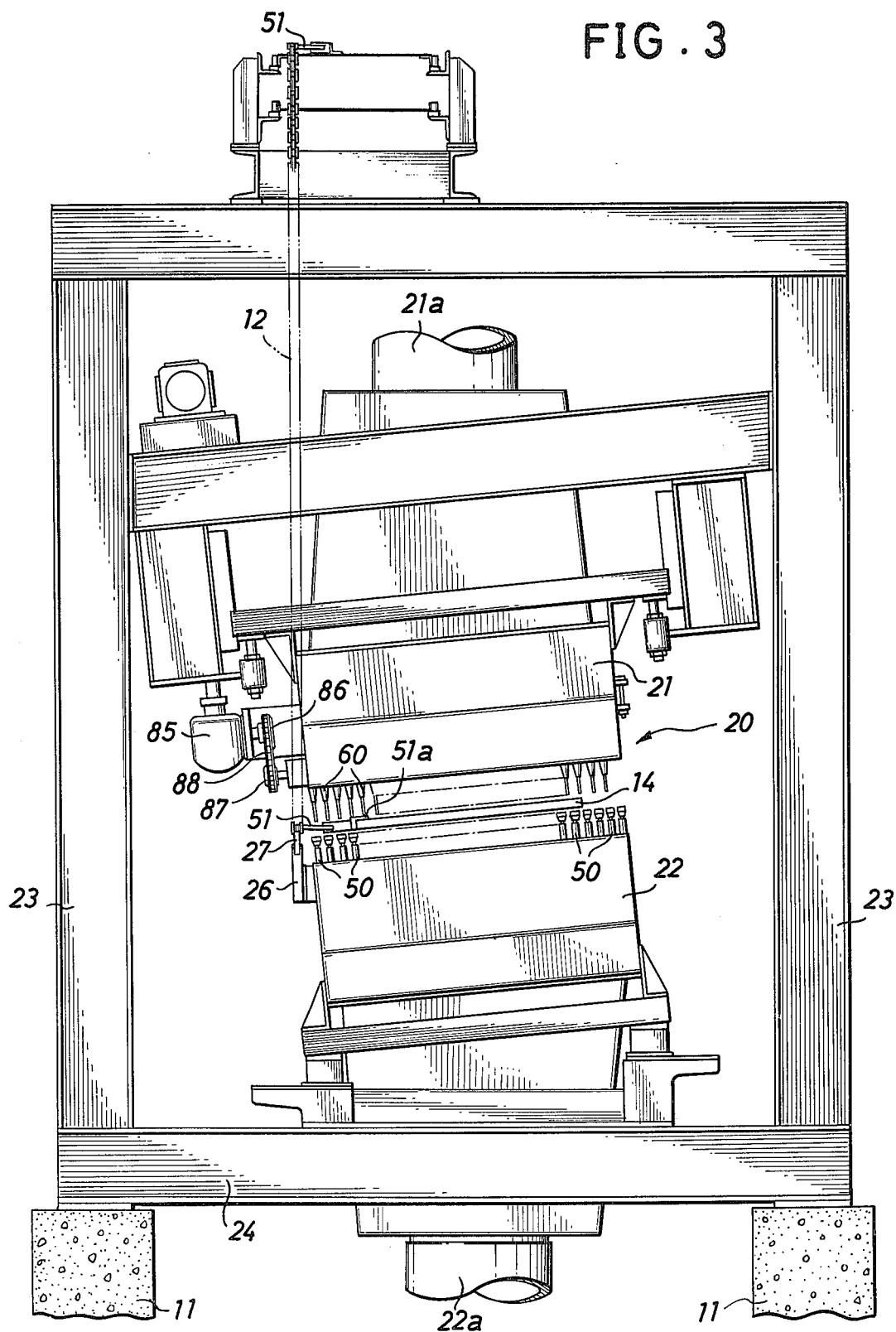

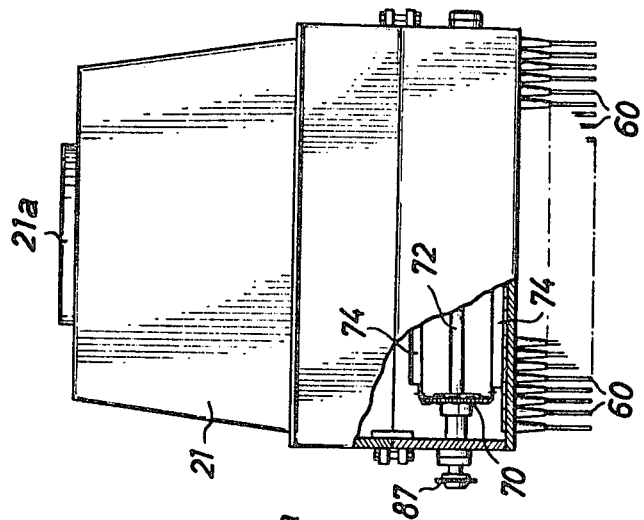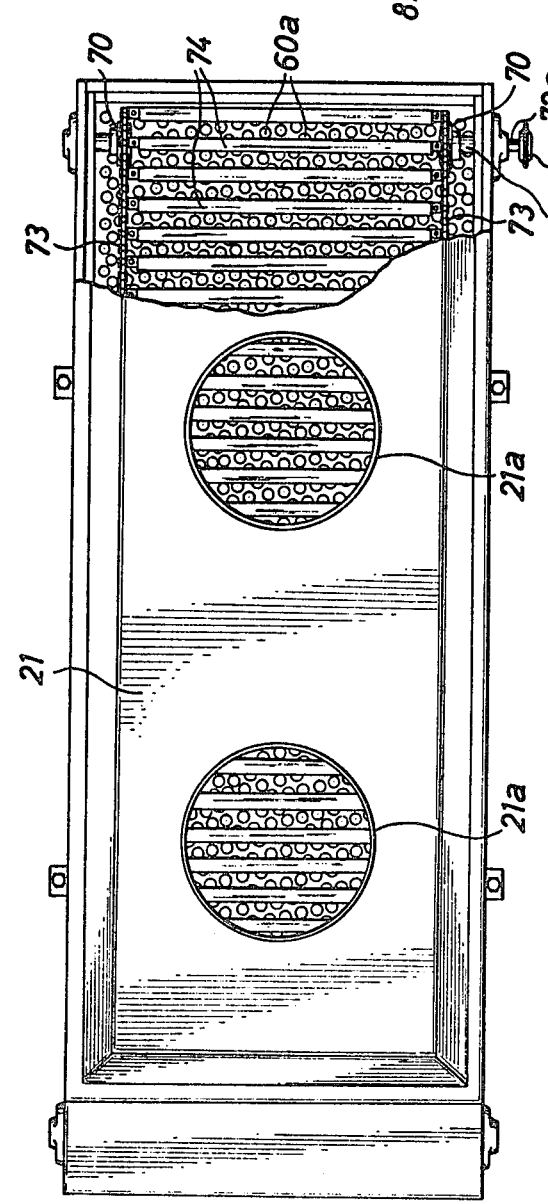

METHOD OF QUENCHING GLASS SHEETS

BACKGROUND OF THE INVENTION

This invention relates to a method for quenching heated glass sheets with air nozzles to strengthen them.

More particularly, the present invention relates to a method of quenching glass sheets wherein a glass sheet moving through a quenching section is blown in the same portions throughout the quenching section with air from nozzles and is moved while being rapidly cooled in the same portions so as to set up the differentials of residual strains on the glass surface.

A glass sheet used as a windshield of an automobile is heated in a heating furnace, is then conveyed to a quenching section, is blown with air and is rapidly cooled to be a tempered glass sheet. A compression strain is developed on the rapidly cooled glass surface and a tension strain corresponding to the compression strain is developed in the interior portion which chills gradually, with the strength of the glass being determined by the differential rates of cooling between the surface and the interior of the glass body.

Nowadays, a standard tends to be set for the purpose of avoiding the danger when a side glass or rear glass of an automobile is broken. This standard is to regulate whether or not there are long pieces (called splines) over the length of 6 cm. produced when the glass breaks, and the number of broken pieces. According to the already set British Standard No. BS 5282 "Road Running Vehicle Safety Glass," it is required that the number of broken pieces per unit area of $5 \times 5$ cm. of a glass sheet of a thickness no more than 4 mm. should be in a range of 40 to 400. Where a glass sheet is rapidly cooled and tempered to generate a compression strain by quenching the glass surface, if this strain is made large, splines will be eliminated but the number of broken pieces per unit area will increase. If the strain is made to be below a certain value in order to keep the number of broken pieces within an allowable upper limit, contrary to the above, splines will be produced. It has recently been required to solve this technical problem and it is desired to prevent the generation of splines while keeping the number of broken pieces within the allowable range defined by the standard.

The present inventors have made the present invention in order to meet the above requirement. Particularly, by obtaining a knowledge that, in quenching step, if the glass sheet is partially quenched on the surface and the strain differentials are set up on the surface, the generation of splines will be able to be prevented while keeping the number of broken pieces within a predetermined range.

SUMMARY OF THE INVENTION

The present invention contributes to provide a safe tempered glass sheet wherein the number of broken pieces when it is broken is kept within a predetermined range and the generation of splines is inhibited.

An object of the invention is to provide a method of quenching a glass sheet wherein a heated glass sheet is moved through a quenching section, is blown in the same portions during the movement with air from a plurality of nozzles so as to provide rapidly cooled portions and uncooled portions.

Therefore, according to the present invention, it is possible to retain the strain differentials set up on the surface of glass sheets which is cooled to the normal temperature, between the rapidly cooled portion and uncooled portion of the glass surface. Therefore, when the glass sheet is broken, the generation of splines will be able to be inhibited while keeping the number of broken pieces within a required range.

Another object of the invention is to provide a method of quenching a glass sheet wherein air is intermittently jetted out of nozzles arranged as opposed to the entire glass sheet moving area in a quenching section, and the air jetting nozzles are changed in turn so as to coincide with the moving speed and moving direction of the glass sheet by synchronizing the intermittent jetting of the air with the movement of the glass sheet to provide, on the glass sheet surface, portions blown with air and portions blown with no air alternately in the glass sheet advancing direction.

By this method, it is possible to blow the glass surface in the same portions with air with the movement of the glass sheet and to retain the strain differentials set up on the surface of the glass sheet cooled to the normal temperature between the rapidly cooled portion and uncooled portion of the glass surface. Therefore, when the glass plate is broken, the generation of splines will be able to be inhibited while keeping the number of broken pieces within a required range.

Still another object of the invention is to provide a method of quenching glass sheet wherein endless running belts, are provided with a plurality of baffle members closing the air nozzles, run in the same direction and at the same speed as the glass sheet, to close the nozzles in turn with the baffle members and to jet air out of the nozzles between the baffle members.

By such a method, even if the air nozzles are arranged as fixed in the quenching section, the air jetting nozzles will be able to be changed to coincide with the moving speed and moving direction of the glass sheet.

A further object of the invention is to provide a method of quenching a glass sheet wherein, after the glass sheet is heated in the heating section, by the conveying operation of an endless running belt, such as a chain, the heated glass sheet is continuously conveyed into and through the quenching section which is horizontally provided adjacent to the heating section.

The glass sheet can be heated and quenched in series while the endless running belt runs through the heating section and the successive quenching section and, when the glass sheet is delivered out of the quenching section, the treatment required for the tempering of glass will be completed. Therefore, the present invention can make the operation quick and is adapted to mass production with simple steps.

A preferred embodiment of the present invention shall be explained in the following with reference to the accompanying drawings so that further objects and features of the invention may become apparent.

DESCRIPTION OF THE DRAWINGS

FIG. 3 is a right side view of FIG. 2, omitting the driving system such as a motor.

FIG. 6 is a partly sectioned plan view of an upper header.

FIG. 7 is a partly sectioned side view of the upper header.

DESCRIPTION OF THE PREFERRED EMBODIMENT

Figure 1:
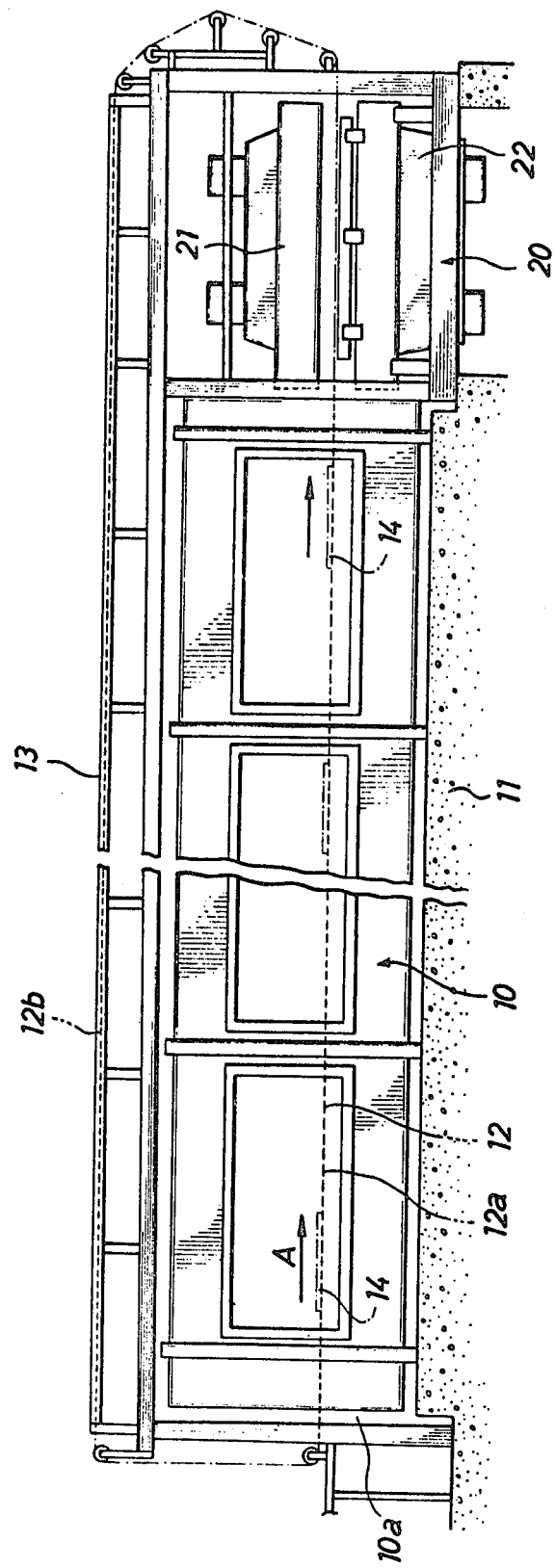
FIG. 1 is an entire elevation showing a heating furnace and a successive quenching station.

As shown in FIG. 1, a heating section or furnace 10 and a quenching section or station 20 are installed and set on bases 11 to form a horizontally continued series of working sections. The inlet end of the quenching station 20 is connected to the outlet end of the heating furnace 10. A lower half 12a of a chain 12, which is an endless running belt, runs in the direction indicated by an arrow A through the heating furnace 10 and quenching station 20. An upper half 12b of the chain 12 returns to the heating furnace 10 from the quenching station 20 along a horizontal beam 13 provided above the working sections. The chain 12 is fitted with members for engagement with glass sheet 14 so that, when the chain 12 runs through the heating furnace 10, the glass sheet 14, put on the chain through the inlet end 10a of the heating furnace 10, may be engaged at the end of the sheet with these members so as to be conveyed through the horizontally long heating furnace 10. Many nozzles blowing high temperature air are set in the heating furnace 10. The glass sheet 14 which is heated on both upper and lower surfaces by this high temperature air or such heating means as a heater, and is further supported to float by a film of air jetted out of the nozzles, advances in this state through the heating furnace 10 and is uniformly heated near to a deformation temperature before it reaches the end of the heating furnace 10.

If the endless running belt running through the heating furnace 10 to convey the glass sheet 14 is formed of the chain 12 as described above, the accident such as a burning of the endless running belt due to the high temperature of the heating furnace 10 will not occur.

The glass sheet 14 is next conveyed to the quenching station continuously as it is by the running of the chain 12, and is then quenched with air on both upper and lower surfaces in the same portions thereof by the later described air nozzles set in the station 20 while moving through the quenching station 20. Thereby the glass sheet 14 is quenched. When the glass sheet 14 reaches the end of the quenching station, the sheet is delivered onto a receiving stand not illustrated. Thus, the glass sheet 14 is heated, quenched and tempered in a continuous series of operations.

Figure 2:
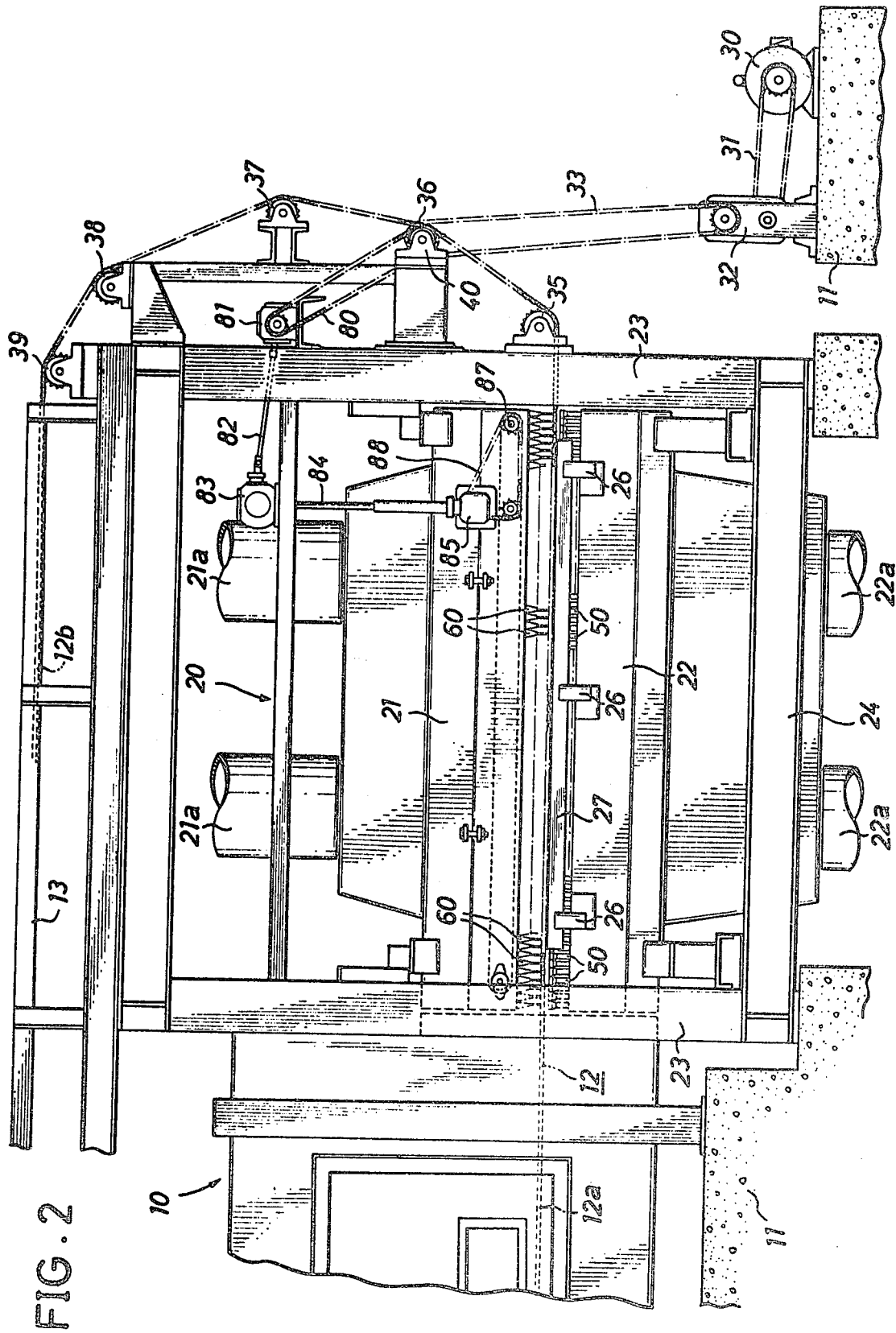
FIG. 2 is an enlarged partial view of FIG. 1, showing the quenching station.

The detailed structure of the quenching station 20 is shown in FIGS. 2 and 3, in which a hollow box-shaped upper header 21 and lower header 22 are vertically opposed to each other with a space for running of the chain 12 being provided between them and are held as connected to vertical beams 23 and horizontal beams 24. Two air ducts 21a and 22a connected to an air feeding source are connected respectively to both headers 21 and 22 so that air of a required pressure may be fed into the headers 21 and 22. As shown in FIG. 3, a chain guide plate 27 is vertically fitted to the side of the lower header 22 by means of a bracket 26 so that the chain 12 having reached the quenching station 20 through the heating furnace 10 may be supported when the upper end of this guide plate 27 enters the space between the link plates of the chain. Therefore, the chain 12 runs through the quenching station along the guide plate 27 extended horizontally as in FIG. 2 while maintaining the height level within the heating furnace.

A plurality of sprocket wheels 35, 36, 37, 38 and 39 for turning the running direction of the chain 12 are provided on the terminal end side of the quenching station 20. A motor 30 which is a driving source is set on the base 11. The driving force of this motor 30 is transmitted to a reduction gear 32 through a chain 31 and is further transmitted to another sprocket wheel provided in a bearing 40 for the sprocket wheel 36 so that the chain 12 may be run by rotation of the sprocket 36 rotated in unison with the another sprocket wheel.

Many air nozzles 50 are fixed as directed upward on the upper surface of the lower header 22. The glass sheet 14 is quenched on the lower surface by air jetted out of these nozzles 50 and is supported to float by the air pressure in the same manner as in the heating furnace 10. Accordingly, the sheet of glass is not deformed by collision with the members, such as the nozzles, while moving as heated to the deformation temperature and is conveyed to the quenching station 20 from the heating furnace 10 as supported to float by the air pressure. As apparent in FIG. 3, the lower header 22 is inclined to the horizontal plane so that the side end of the glass sheet 14, with which the chain 12 is engaged, may be in the lower position and the upper header 21 is also inclined so as to be parallel with the lower header 22. All the lower air nozzles 50 are erected at right angles with the upper surface of the lower header 22 and are of the same length. The upper surface of the nozzles 50 is in a plane inclined by the same angle as the angle of inclination of the lower header 22. Therefore, in case the glass sheet 14 is supported to float by air from the nozzles 50, the glass sheet tends to move toward the lower position side by the gravity.

A member 51 for engagement with the glass sheet is connected to the chain 12 and passes between both upper header 21 and lower header 22 while the chain 12 passes through the quenching station 20 as in FIG. 3. The glass sheet 14 moved toward the lower position by the gravity is stopped where it contacts with an angle bracket 51a provided at the tip of the member 51 and moves together with the chain 12 as engaged with the member 51. The glass sheet 14 is continuously moved by the member 51 from the heating furnace 10.

The air nozzles 50 of the lower header 22 are provided over the entire upper surface of the header 22 so as to be opposed to the entire moving area in the quenching station 20. Also, many upper air nozzles 60 are provided as directed downward on the lower surface of the upper header 21 and are arranged in close order over the entire lower surface of the upper header 21 so as to be opposed to the entire moving area in the quenching station 20.

In the present embodiment, during the movement of the glass sheet 14 in the quenching section, the glass sheet is blown on the entire lower surface with air from the lower air nozzles and is blown on the upper surface only partially, but in unchanged or the same portions with air from the upper nozzles, so that portions blown with air and portions not blown with air may be provided only on the upper surface of the glass sheet. However, it is possible to blow the glass sheet on the lower surface with air only in unchanged portions. Such a method can be attained by an air jetting controlling means for the air nozzles 60 explained hereafter, or by a means similar to that or by arranging the lower air nozzles 50 linearly in the glass sheet 14 moving direction and at intervals in a direction at right angles to this moving direction.

An example of blowing the moving glass sheet 14 with air in same portion can be attained by moving the nozzles 60 at the same moving speed in the same moving direction as of the glass sheet 14. Further, as another example, a plate member which is provided with openings permitting air to pass therethrough may be interposed between the nozzles 60 and the glass sheet 14 to move at the same speed and in the same direction as of the glass sheet 14. Another method wherein the structure can be made more simple than each of these methods is adopted in the present embodiment. According to this method, even if the plate member in which the openings are formed is not used or the upper air nozzles 60 are arranged in a fixed position, the same portions on the glass surface can be blown with air. This method is characterized in that air is intermittently jetted out of the nozzles 60 and stopped as synchronized with the movement of the glass sheet by changing the air jetting nozzles 60 in turn to coincide with the moving direction and moving speed of the glass sheet 14.

Means of controlling the air jetting out of the upper air nozzles 60 shall be explained in detail hereafter.

Figure 4:
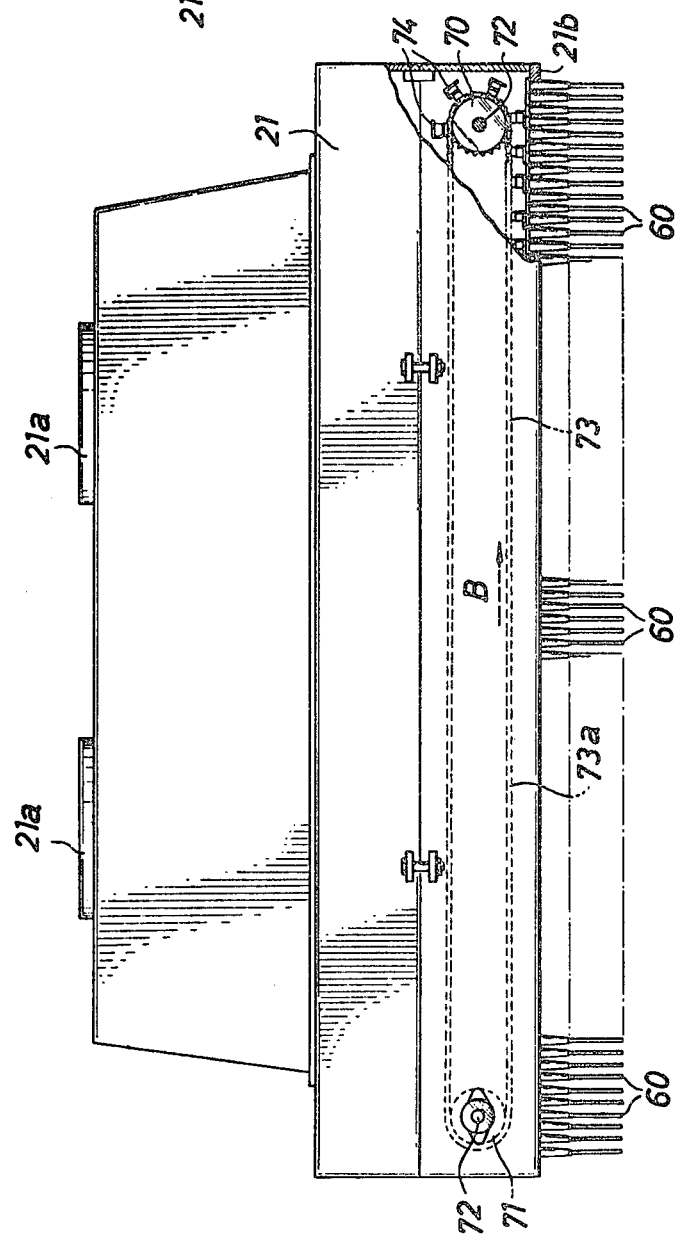
FIG. 4 is a partly sectioned elevational view showing an upper header provided with air nozzles.

As shown in FIGS. 4 and 6, two pairs of sprocket wheels 70 and 71 are incorporated at both ends within the upper header 21 and the two sprocket wheels forming a pair are connected with each other through a shaft 72. Chains 73 which constitute endless running belts are provided between the sprocket wheels 70 and 71 of the respective pairs. As shown in FIG. 4, these chains 73 are provided so that the running direction B of the lower half 73a may be in the same direction as the running direction A of the glass sheet conveying chain 12 shown in FIG. 1, i.e., the moving direction of the glass sheet 14. As shown in FIG. 6, baffle members 74 are crosswise provided on a pair of the chains 73, are integrally connected respectively at both ends to the pins and link plates of the chains 73 and are arranged at regular intervals over the entire length of the chains 73. In the illustrated embodiment, the baffle member 74 is made flat, narrow and long, but its configuration and surface area can be freely determined correspondingly to the selection of the upper air nozzles 60 to jet air, that is, the portions of the surface of the glass sheet 14 to be blown with air.

The upper air nozzles 60 are inserted and fixed at the base ends into the lower surface plate 21b of the upper header 21 and openings 60a provided at the base end faces open in and communicate with a space within the upper header 21 so that the upper header 21 may serve as a supporting member for the upper air nozzles 60 and a distributing member for distributing air to all the nozzles 60. When the baffle members 74 advance in the direction B in FIG. 4 with the running of the chains 73, the baffle members 74 will slide in contact with the openings 60a at the base ends of the nozzles 60. Thus, the upper air nozzle 60 will be closed by the baffle member 74 and the jetting of air out of the nozzle 60 will stop. After the baffle member 74 passes, and only before the next baffle member 74 arrives, the opening 60a will open and will jet air.

The space within the upper header 21 is filled with high pressure air from the air feeding source through the ducts 21a. Therefore, high pressure air acts on the baffle member 74 which is thereby pressed against the opening 60a of the nozzle 60 so that the leakage of air into the nozzle 60 may be positively prevented. In the present embodiment, in addition to the above structure, the baffle member 74 is formed of an elastic material such as a flexible synthetic resin material so that the baffle member 74 may be easily pressed into elastic contact with the nozzle 60 by its own flexibility, and the close contact of the baffle member 74 with the nozzle 60 may be further improved in addition to that provided by the high air pressure.

A device for driving the chains 73 for moving the baffle members 74 shall be described hereafter.

A sprocket wheel on which a chain 80 is engaged is provided in a bearing part 40 shown in FIG. 2. Therefore, the sprocket wheel of a chain 33 driven by the motor 30, the sprocket wheel 36 of the glass sheet conveying chain 12 and the sprocket wheel of a chain 80 are coaxially triplicately arranged in this bearing part 40. The chain 80 is driven by the motor 30 together with the chain 12. The driving force of the chain 80 is transmitted to a power relaying means 83 through a gear box 81 and connecting rod 82. Further, a driving force is transmitted to the gear box 85 through a connecting rod 84 extending vertically downward from this power relaying means 83. A sprocket wheel 86 shown in FIG. 3 is fitted to this gear box. A shaft 72 of a sprocket wheel 70 incorporated within the header 21 projects out of the header 21 as shown in FIG. 6 and a sprocket wheel 87 is fitted to this projecting part 72a. A chain 88 shown in FIGS. 2 and 3 is provided on this sprocket wheel 87 and the sprocket wheel 86 of the gear box 85.

By the above, the motor 30 is a driving source not only for the glass sheet conveying chain 12 but also for the baffle member 74 moving chains 73 and the driving forces of both chains 12 and 73 are branched in the bearing part 40. In this case, the power transmitting system from the bearing part 40 to the sprocket wheel 70 of the chain 73, that is, the driving device consisting of the chain 80, gear box 81, connecting rod 82, power relaying means 83, connecting rod 84, gear box 85, sprocket wheel 86, chain 88 and sprocket wheel 87, is so formed as to be able to run the chains 73, which are endless running belts, at the same speed and in the same direction as the glass sheet conveying chain 12 by the adjustment of the gear ratios or the sizes of the sprocket wheels. Therefore, when the chain 12 runs through the heating section and quenching section to convey the glass sheet 14, the chains 73 run as synchronized with the chain 12.

While the glass sheet 14 heated in the heating furnace 10 moves through the quenching section under the conveying action of the chain 12, the baffle members 74 fitted to the chains 73 move in coincidence with the moving direction and moving speed of the glass sheet 14 and close the openings 60a at the base ends of the upper air nozzles 60 in turn. The jetting of air out of the nozzle closed with the baffle member 74 stops but is continued out of the nozzle not closed, until such nozzle is closed. Air is intermittently jetted out of the respective nozzles 60 and stopped as synchronized with the movement of the glass sheet 14 through the quenching section. The air jetting nozzles 60 change in turn in coincidence with the moving speed and moving direction of the glass sheet 14.

Thus, while the glass sheet 14 moves through the quenching section, the glass sheet is blown on the surface with air in the same portions from many upper air nozzles 60, arranged as fixed in this section, but is not blown in other portions with air so that portions rapidly cooled by air and portions uncooled may be made on the glass surface. The areas of these portions are determined by the flat shape and surface area of the baffle member 74. When the shape and surface area of the baffle member 74 are properly determined, the glass surface will be able to be partially quenched in respective narrow zones. When the glass sheet 14 is reduced in temperature to the normal temperature, the differentials of the residual strain will be set up between the rapidly cooled portions and the uncooled portions.

As explained above, in the present embodiment, air is intermittently jetted out of the respective nozzles 60 and stopped as synchronized with the movement of the glass sheet 14. However, the intermittent air jet can be made also by such a program in which the air circuits of the respective nozzles are constituted by separate systems respectively so as to be set on and off in conformity with the movement of the glass sheet 14.

Figure 5:
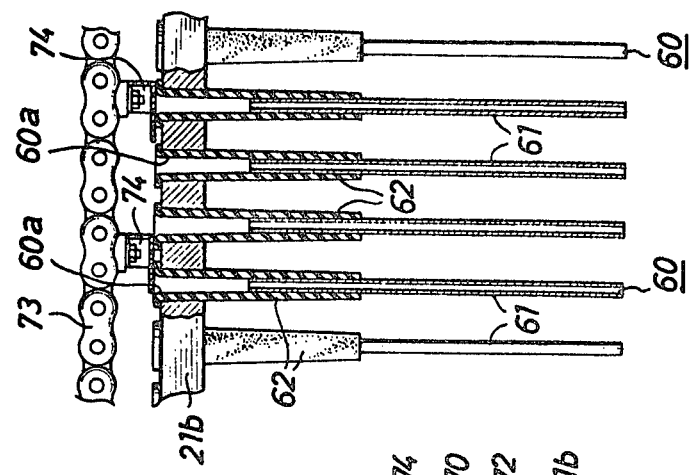
FIG. 5 is an enlarged partial view of FIG. 4, showing the air nozzles as closed with baffle members.

As clearly shown in FIG. 5, each upper air nozzle 60, arranged as fixed to be directed downward on the lower plate 21a of the upper header 21, is provided at the tip side with a pipe member 61 projecting toward the glass surface and at the base side with a cylinder member 62 fitted to the lower plate 21a. The nozzle 60 is formed by fitting the pipe member 61 within the cylinder member 62.

RESULTS OF EXPERIMENTS

A quenching station 20 was provided adjacent to a heating furnace 10. As in FIG. 2, lower air nozzles 50 and upper air nozzles 60 were arranged as fixed in the quenching station 20. A plurality of baffle members 74 were fitted to chains 73 incorporated within the upper header 21. The baffle members 74 were 25 mm. wide, 490 mm. long and 0.5 mm. thick and were made of vinyl chloride. The baffle members 74 were moved at the same speed in the same direction as of a glass sheet 14 which was 460 mm. wide, 1060 mm. long and 4.1 mm. thick. The glass sheet 14 coming out of the heating furnace 10 was at a temperature of 650° C. and a moving speed of 16.0 m./min. The air pressure from the nozzles 50 and 60 was 750 mm. Aq.

When the glass sheet thus quenched by blowing the glass surface with air in the same portions by using the baffle members 74 was purposely broken, the number of broken pieces per unit area of 5×5 cm. was 57 to 259. 4 Glass sheets were broken and substantially no spline of a length exceeding 6 cm. was produced.

On the other hand, when a glass sheet quenched on the entire surface without using baffle members was purposely broken, the number of broken pieces per unit area of 5×5 cm. was 57 to 230. 4 Glass sheets were broken and 16 splines of a length exceeding 6 mm. were produced.

As evident from the results of this experiment, it is found that the number of broken pieces in the case of using baffle members 74 was substantially the same as in the case of using no baffle members and both were within the required range of the standard; but that the splines were reduced by the present invention when the baffle members 74 were used.

According to the present invention, if quenched portions and unquenched portions are alternately provided in each narrow zone on a glass surface so that the differentials of the residual strains may be set up on the glass surface, the generation of splines will be able to be prevented while keeping the number of broken pieces within the range of the standard.

What is claimed is:

1. A method of quenching glass sheets characterized in that a heated glass sheet is moved through a quenching section, is blown with air in some portions from a plurality of nozzles during said movement so as to provide rapidly cooled portions and uncooled portions;
   wherein the air is intermittently jetted out of nozzles arranged as opposed to the entire glass sheet moving area in said quenching section, and the air jetting nozzles through which the air is jetted out are opened and closed in turn by advancing baffles so as to coincide with the moving speed and moving direction of said glass sheet by synchronizing said intermittent jetting of air with the movement of said glass sheet to provide, on the glass sheet surface, portions blown with air and portions blown with no air alternately in the glass sheet advancing direction; and
   wherein the synchronizing of the jetting is provided by a chain driving the advancing baffles and running in unison with the advancing glass sheet.

2. A method of quenching glass plates according to claim 1, wherein said quenching section and a glass sheet heating section which is a section before said quenching section are horizontally provided adjacent to each other and an endless running belt is run through said heating and quenching sections and is provided with members for engaging with said glass sheet so that the glass sheet may be continuously conveyed to said quenching section from said heating section by said engaging member with said running of the endless running belt.

3. A method of quenching glass sheets characterized in that a heated glass sheet is moved through a quenching section, is blown with air in some portions from a plurality of nozzles during said movement so as to provide rapidly cooled portions and uncooled portions;
   wherein the air is intermittently jetted out of nozzles arranged as opposed to the entire glass sheet moving area in said quenching section, and the air jetting nozzles through which the air is jetted out are changed in turn so as to coincide with the moving speed and moving direction of said glass sheet by synchronizing said intermittent jetting of air with the movement of said glass sheet to provide, on the glass sheet surface, portions blown with air and portions blown with no air alternately in the glass sheet advancing direction; and
   wherein endless running belts provided with a plurality of baffle members for closing said air nozzles are provided so as to be able to run in the same direction and at the same speed as the glass sheet to close the nozzles in turn with said baffle members and to intermittently jet air out of the nozzles through between said baffle members.

4. A method of quenching glass sheets according to claim 3, wherein said quenching section is provided with a hollow box-shaped header fed with air, said nozzles are fixed to said header so that openings at the base ends of said nozzles may open in the space within said header and said endless running belts are incorporated within said header so as to press said baffle members against said openings at the base ends of said nozzles with the air pressure within said header to close said nozzles.

5. A method of quenching glass sheets according to claim 4, wherein said baffle member is formed of an elastic material so as to be elastically pressed against said opening at the base end of said nozzle.

* * * * *